United States Patent

Kress

Patent Number: 5,949,406
Date of Patent: Sep. 7, 1999

[54] MOUSE CROWN

[76] Inventor: Roxanne M. Kress, 2858 Teasdale, Troy, Mich. 48083

[21] Appl. No.: 09/005,741

[22] Filed: Jan. 12, 1998

[51] Int. Cl.[6] .................................................. G09G 5/08
[52] U.S. Cl. ..................... 345/163; 248/118.1; D14/114
[58] Field of Search ...................... 345/163, 156, 345/157, 160, 162–165; 248/118, 118.1, 118.3, 118.5, 918, 919; D14/114; 341/20, 21; 400/715; 361/380, 381; 200/5 R

[56] References Cited

U.S. PATENT DOCUMENTS

| | | |
|---|---|---|
| D. 354,746 | 1/1995 | Colani et al. . |
| D. 372,906 | 8/1996 | Kawauchi et al. ............... D14/114 |
| D. 373,999 | 9/1996 | Staats . |
| D. 380,463 | 7/1997 | Wu ............................... D14/114 |
| D. 383,453 | 9/1997 | Scenna et al. .................. D14/114 |
| 5,335,888 | 8/1994 | Thomsen . |
| 5,340,067 | 8/1994 | Martin et al. .................. 248/118.5 |
| 5,490,647 | 2/1996 | Rice ............................. 248/118.1 |
| 5,562,270 | 10/1996 | Montague .................... 248/118.1 |
| 5,581,277 | 12/1996 | Tajiri ........................... 345/163 |

*Primary Examiner*—Regina Liang
*Attorney, Agent, or Firm*—Harness, Dickey & Pierce, P.L.C.

[57] ABSTRACT

A finger support device to be attached to a top surface of a computer mouse. The finger support device includes two or more spherical shaped recesses that are configured to accept two or more fingers of the user of the mouse so that the user's fingers are correctly positioned relative to the mouse selector switches.

18 Claims, 2 Drawing Sheets

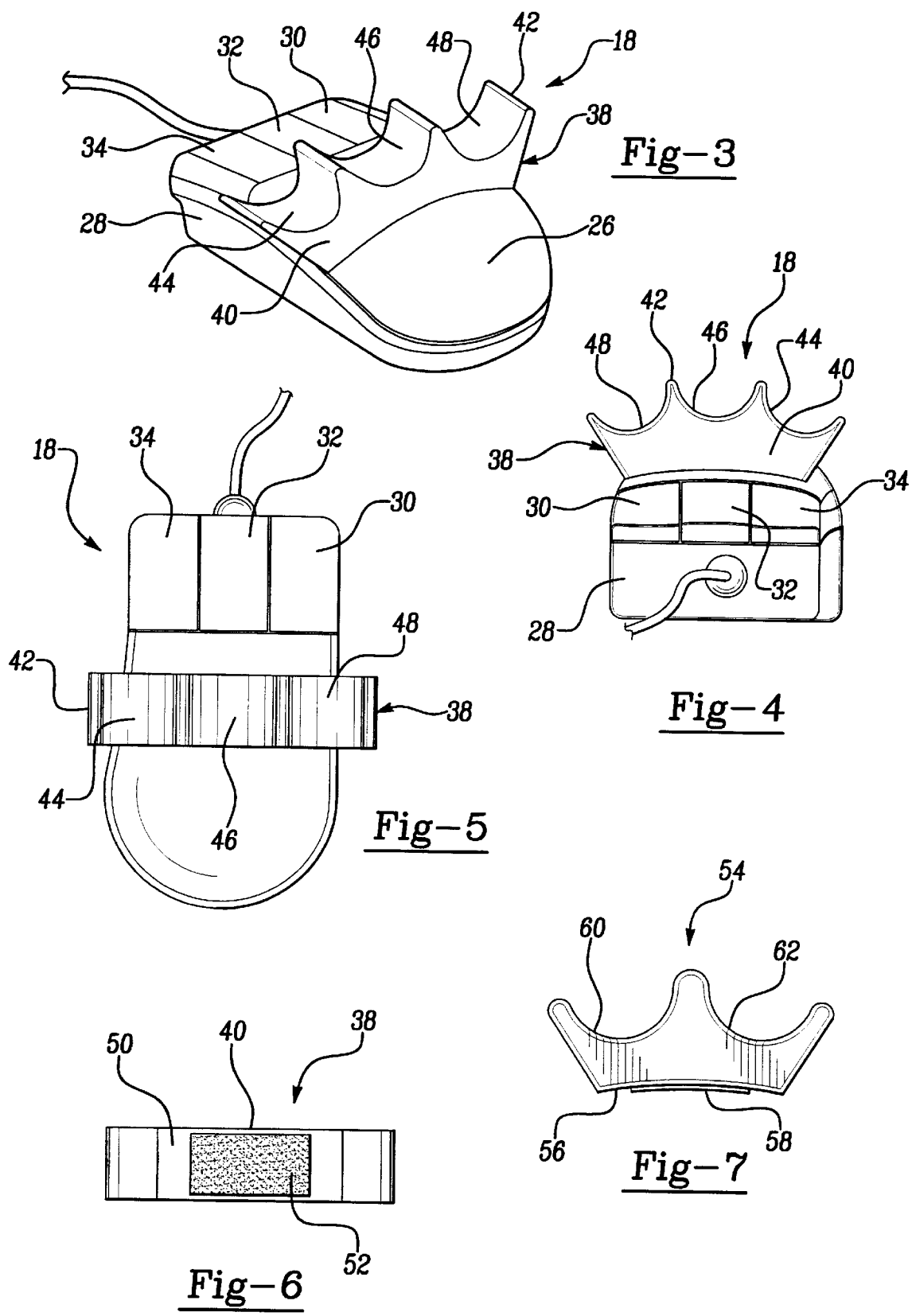

MOUSE CROWN

BACKGROUND OF THE INVENTION

1. Field of the Invention

This invention relates generally to a finger support device secured to a computer mouse and, more particularly, to a finger support device secured to the top surface of a computer mouse that aligns and supports two or more fingers of the operator of the mouse relative to the mouse keys.

2. Discussion of the Related Art

Most state of the art computers incorporate a computer mouse that is used to select icons, menus, text, and other visible selections displayed on the monitor screen associated with the computer. The user will align a pointer on the screen with the desired selection and then depress a mouse key to select the selection. The computer mouse includes an internal track ball such that when the bottom of the mouse is moved on an appropriate surface, the ball rotates and the pointer moves on the screen. The specific operation of the mouse is well understood to those skilled in the art. The computer mouse operates in association with the keyboard to make operation of the computer easier and more user friendly.

The computer mouse is a hand held device that includes a palm portion and one or more extended push-button selector switches. A user will place her palm on the palm portion in a position so that her fingers are aligned with the selector switches to be able to readily depress the switches when the pointer is aligned at the desirable location on the screen. Typically, the user's palm will be positioned at a back area of the palm portion opposite to the selector switches so that her finger tips will be contacting the selector switches. In this position, the area of the user's palm connected to her fingers and most of the length of the fingers will be positioned off of the mouse, and will be unsupported such that the user's hand is not in a completely comfortable position. Because many computer operations, uses, and activities require long and continuous use of the mouse, the position of the user's hand on the mouse may provide certain problems, such as operator inaccuracy, discomfort, fatigue, achiness, cramps, etc. Further, it has been documented that extended use of a computer mouse may also cause other, more serious, health related problems such as carpal tunnel syndrome. These problems can lead to undesirable situations, such as loss of productivity, increased health costs, and possibly permanent health results.

Different types of support devices used in conjunction with a computer mouse are known in the art that are designed to reduce the discomforts and health risks associated with extended use of the computer mouse. For example, U.S. Pat. No. 5,335,888 issued to Thomsen discloses a forearm support cradle for supporting the forearm of a computer operator above a work surface as the operator's hand and forearm are moved across the work surface to operate a computer mouse. U.S. Pat. No. 5,562,270 issued to Montague discloses a computer mouse pad incorporating a wrist rest to provide a non-fatigue environment for manipulation of a computer mouse. U.S. Pat. No. 5,490,647 issued to Rice discloses a palm rest used in association with a computer mouse to allow the operator of the mouse to rest her palm while activating the mouse to reduce possible health related problems. U.S. Pat. No. 5,581,277 issued to Tjiri discloses a spherical palm support that is releasably attached to a top surface of the computer mouse to allow the mouse operator to rest her palm on the palm support when operating the mouse.

None of the prior art appears to teach providing for the support and alignment of the fingers of the user when she is operating the mouse. This invention satisfies that need.

SUMMARY OF THE INVENTION

In accordance with the teachings of the present invention, a finger support is disclosed that is attached to a top surface of a computer mouse. The finger support can be secured to the mouse by any suitable device, such as by two-sided tape, or can be an integral member with the mouse housing. Additionally, the finger support can be secured to the mouse in a manner so that it can be readily removed and reattached so as to be movable to different positions for different operators. The finger support includes recessed areas configured to support two or more fingers of the user at a location on the mouse such that the user's fingers are correctly aligned and positioned relative to the mouse selector switches.

Additional objects, advantages and features of the present invention will become apparent from the following description and appended claims, taken in conjunction with the accompanying drawings.

BRIEF DESCRIPTION OF THE DRAWINGS

FIG. 3 is an enlarged perspective view of the computer mouse and mouse crown of the invention;

FIG. 4 is a front elevation view of the mouse and mouse crown shown in FIG. 3;

FIG. 5 is a top elevation view of the mouse and mouse crown shown in FIG. 3;

FIG. 6 is a bottom elevation view of the mouse crown shown in FIG. 3; and

FIG. 7 is a front view of a mouse crown detached from the mouse, including support positions for two fingers of the computer mouse operator, according to another embodiment of the present invention.

DETAILED DESCRIPTION OF THE PREFERRED EMBODIMENTS

The following description of the preferred embodiments directed to a mouse crown that supports and aligns the fingers of an operator using a computer mouse is merely exemplary in nature, and is in no way intended to limit the invention or its application or uses.

Figure 1:
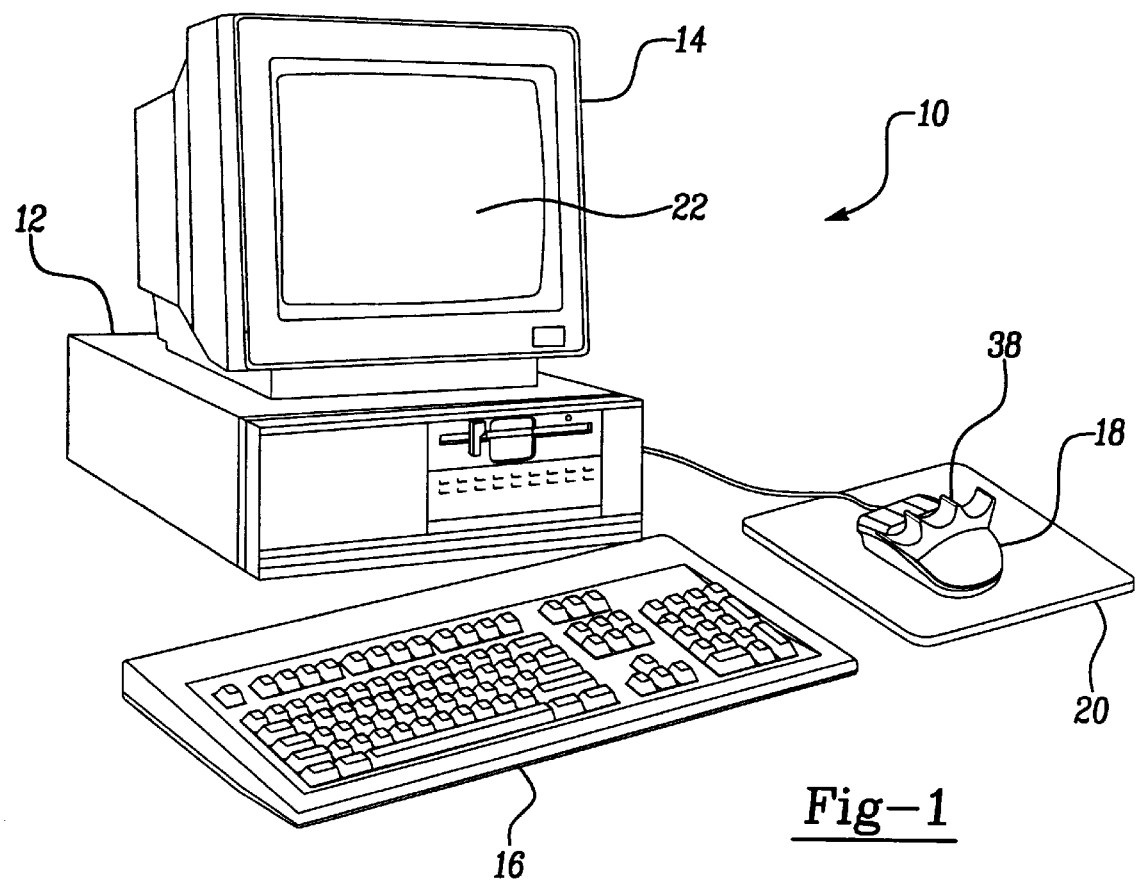
FIG. 1 is a perspective lay-out view of a computer system including a computer, computer monitor, keyboard and computer mouse including a mouse crown, according to an embodiment of the present invention.

FIG. 1 shows a perspective lay-out view of a computer system 10 including a computer 12, a computer monitor 14, a keyboard 16 and a computer mouse 18 positioned on a mouse pad 20. The computer monitor 14 includes a screen 22 that displays computer generated displays such as text, icons, menus, graphics, etc. as is well understood in the art. The computer system 10 is intended to represent any computer system known in the art that makes use of a computer mouse, and therefore its operation would be known to those skilled in the art.

FIGS. 2–6 show several different views of the mouse 18 separated from the computer system 10. Computer mice come in a variety of shapes, but typically have the general shape as shown in FIG. 1. The mouse 18 is intended to represent all computer mice of this type. The mouse 18 includes a palm portion 26 and an extended forward portion 28. The forward portion 28 includes a right selection key 30, a middle selection key 32 and a left selection key 34 that when activated cause the computer to perform a particular function depending on the location of the pointer (not shown) on the screen 22. The operation of the computer mouse 18 is well understood in the art, and forms no part of the present invention.

According to an embodiment of the present invention, the mouse 18 includes a mouse crown 38 secured to a curved top surface of the palm portion 26 at a desirable location. The mouse crown 38 includes a single piece body 40 having the general shape as shown. The body 40 can be made of any suitable material such as plastic, synthetic rubber, nylon, foam, gel, etc., and can be formed by any suitable process, such as injection molding, vacuum forming, etc. In one embodiment, the width of the body 40 is about one inch, the length of the body 40 is about 2½–3 inches, and the total height of the body 40 is about one inch. Of course, these dimensions are merely representative of one particular mouse crown, and as will be appreciated by those skilled in the art, other sizes of mouse crowns can be used depending on the particular mouse and operator.

A top surface of the mouse crown 38 includes a series of side-by-side semi-circular shaped recesses defined by extended ridges 42 that are configured to conform to the fingers of the user's hand. For the embodiment shown in FIGS. 1–5, the mouse crown 38 includes an index finger recessed portion 44, a second finger recessed portion 46 and a third finger recessed portion 48.

The mouse crown 38 includes a curved bottom surface 50 (FIG. 6) that conforms to the shape of the top surface of the palm portion 26. The invention contemplates any suitable technique, known in the art, applicable to secure the mouse crown 38 to the mouse 18. For example, a two sided adhesive strip 52 can be used to secure the mouse crown 38 to the mouse 18 as shown in FIG. 6. Additionally, the mouse crown 38 can be integrally formed with the housing of the mouse 18. Also, the invention contemplates removably securing the mouse crown 38 to the mouse 18 so that it is selectively positionable on the palm portion 26 to accommodate the size and shape of the fingers of different operators that may be using the same mouse. For example, the mouse 18 and mouse crown 38 can be equipped with a hook and loop type material so that the mouse crown 38 can be removed from the mouse 18 and placed in a different orientation. Other readily releasable fasteners, such as magnetic strips, releasable glue, etc. can also be used.

Figure 2:
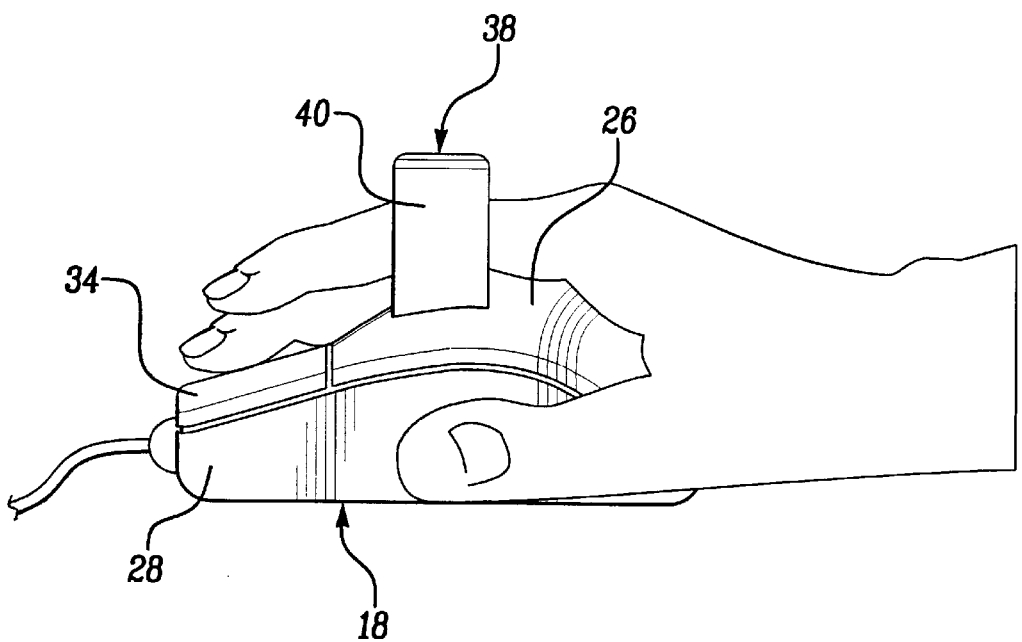
FIG. 2 is an enlarged elevation side view of the computer mouse showing a computer operator's hand positioned on the mouse with her fingers positioned on the mouse crown.

The mouse crown 38 is positioned on the palm portion 26 so that the user's fingers are positioned within the recessed portions 44–48 so that the ends of the user's fingers are aligned with the keys 30–34 as shown in FIG. 2. In this embodiment, the user places her index finger in the recessed portion 44, her second finger in the recessed portion 46 and her third finger in the recessed portion 48, such that the finger tip of the index finger is aligned with the selector key 34, the finger tip of the second finger is aligned with the selector key 32, and the finger tip of the third finger is aligned with the selector key 30. In this position, the user's fingers are supported and aligned on the mouse 18 in a more comfortable and natural position so that prolonged use of the mouse 18 does not cause as much discomfort and other health related problems compared to using the mouse 18 without the crown 38. The mouse crown 38 provides proper placement of the user's fingers, proper handling of the computer mouse 18, ease of handling the computer mouse 18, and is more accurate and ergonomically correct.

The three finger mouse crown 38 is used with the mouse 18 because the mouse 18 includes three selector switches 30–34. Of course, other mouse designs include two selector switches or even one selector switch. Therefore, it is within the design of the present invention to provide a mouse crown with other numbers of finger support areas. In this regard, FIG. 7 shows a mouse crown 54 separated from the mouse 18, according to another embodiment of the present invention. The mouse crown 54 includes a curved bottom surface 56 including a two sided adhesive strip 58 to support the mouse crown 54 to the computer mouse 18. The top surface of the mouse crown 54 includes a semi-circular index finger recessed portion 60 and a second finger recessed portion 62, as shown. The mouse crown 54 is intended to be used with mouses that include two selector switches. However, the mouse crown 54 can be used on any mouse with any number of selector switches. Additionally, the size of the recessed areas 60 and 62 can be changed from mouse crown to mouse crown to accommodate users having different sized fingers.

The foregoing discussion discloses and describes merely exemplary embodiments of the present invention. One skilled in the art will readily recognize from such discussion, and from the accompanying drawings and claims, that various changes, modifications and variations to be made therein without departing from the spirit and scope of the invention as defined in the following claims.

What is claimed is:

1. A support device for supporting one or more fingers of an operator using a computer mouse, said device comprising:

a support body defining a top surface and a bottom surface, said bottom surface being configured to conform with a top surface of the computer mouse, said top surface including at least one recessed portion configured to accept a finger of the operator of the computer mouse such that when the support device is attached to the computer mouse, an end of the operator's finger is properly oriented relative to a selector key of the mouse; and a securing device attached to the bottom surface of the support body and allowing the support body to be secured to the computer mouse.

2. The support device according to claim 1 wherein the at least one recessed portion is a semi-circular shaped recessed portion that conforms to the shape of the operator's finger and is defined by extended ridges.

3. The support device according to claim 2 wherein the top surface defines a first semi-circular shaped recessed portion for accepting one finger of the operator and a second semi-circular shaped recessed portion for accepting another finger of the operator.

4. The support device according to claim 2 wherein the top surface defines a first semi-circular shaped recessed portion for accepting a first finger of the operator, a second semi-circular recessed portion for accepting a second finger of the operator, and a third semi-circular recessed portion for accepting a third finger of the operator.

5. The support device according to claim 1 wherein the securing device is a strip of double-sided adhesive tape.

6. The support device according to claim 1 wherein the body is made of a material selected from the group consisting of a rubber material, a foam material, a gel material, and a plastic material.

7. The support device according to claim 1 wherein the securing device is a device that allows the support device to be readily removed from the computer mouse and repositioned in a different location.

8. A computer mouse comprising:
- a computer mouse housing including a palm portion having a curved top surface and an extended portion extending from the palm portion;
- at least one mouse selection key positioned on the extended portion and being depressed to activate the computer mouse; and
- a support device, said support device secured to the top surface of the palm portion, said support device including at least one recessed portion configured to accept a finger of an operator of the mouse such that when the operator places her finger within the recessed portion an end of the operator's fingers is properly oriented relative to the at least one selection key.

9. The computer mouse according to claim 8 wherein the support device is secured to the palm portion by a two-sided adhesive strip.

10. The computer mouse according to claim 8 wherein the support device includes a first semi-circular shaped recessed portion for accepting one finger of the operator and a second semi-circular recessed portion for accepting another finger of the operator.

11. The computer mouse according to claim 8 wherein the support device includes a first semi-circular shaped recessed portion for accepting a first finger of the operator, a second semi-circular shaped recessed portion for accepting a second finger of the operator, and a third semi-circular shaped recessed portion for accepting a third finger of the operator.

12. The computer mouse according to claim 8 wherein the support device is made of a material selected from the group consisting of a rubber material, a foam material, a gel material, and a plastic material.

13. The computer mouse according to claim 8 wherein the support device is formed to be integral with a housing of the computer mouse.

14. The support device according to claim 1 wherein the securing device is a device that allows the support device to be readily removed from the computer mouse and repositioned in a different location.

15. A support device for supporting one or more fingers of an operator using a computer mouse, said device comprising:
- a support body defining a top surface and a bottom surface, said support body having a dimensional length that is more than twice the dimensional width of the support body, said bottom surface having a curved configuration to conform with a top surface of the computer mouse, said top surface of the support body including a plurality of ridges defining a plurality of semi-circular shaped recessed portions configured to accept the fingers of the operator of the computer mouse such that when the support device is attached to the computer mouse, the operator's fingers are properly oriented relative to selector keys of the mouse; and
- a two-sided adhesive strip attached to the bottom surface of the support body and allowing the support body to be secured to the computer mouse.

16. The support device according to claim 15 wherein the plurality of semi-circular shaped recessed portions is selected from the group consisting of two semi-circular shaped recessed portions and three semi-circular shaped recessed portions.

17. The support device according to claim 15 wherein the support device is made of a material selected from the group consisting of a rubber material, a foam material, a gel material, and a plastic material.

18. The support device according to claim 15 wherein the length of the support body is about three inches and the width of the support body is about one inch.

* * * * *